United States Patent [19]

Tate et al.

[11] Patent Number: 4,991,198

[45] Date of Patent: Feb. 5, 1991

[54] INTERCONNECTION CONTROL METHOD IN CORDLESS TELEPHONE SYSTEM

[75] Inventors: Kazuyuki Tate, Nagoya; Ryoji Kawasaki, Tokyo; Noboru Saegusa, Tokyo; Yukihiro Shimura, Tokyo; Syoji Huse, Tokyo; Koji Ono, Tokyo, all of Japan

[73] Assignees: Nippon Telegraph and Telephone Corporation; NEC Corporation, both of Tokyo; Kabushiki Kaisha Toshiba, Kanagawa, all of Japan

[21] Appl. No.: 272,839

[22] PCT Filed: Jan. 14, 1988

[86] PCT No.: PCT/JP88/00028

§ 371 Date: Oct. 18, 1988

§ 102(e) Date: Oct. 18, 1988

[87] PCT Pub. No.: WO88/05620

PCT Pub. Date: Jul. 28, 1988

[30] Foreign Application Priority Data

Jan. 16, 1987 [JP] Japan .................................. 62-7775

[51] Int. Cl.⁵ .......................................... H04M 11/00
[52] U.S. Cl. ......................................... 379/62; 379/61
[58] Field of Search .............................. 379/62, 58, 61

[56] References Cited

U.S. PATENT DOCUMENTS

| 4,646,345 | 2/1987 | Zdunek et al. | 379/62 |
| 4,679,225 | 7/1987 | Higashiyama | 379/62 |
| 4,776,001 | 10/1988 | Murata et al. | 379/62 |

FOREIGN PATENT DOCUMENTS

87812/82 3/1983 Australia .
49122/85 5/1986 Australia .

Primary Examiner—Jin F. Ng
Assistant Examiner—Dwayne D. Bost
Attorney, Agent, or Firm—Finnegan, Henderson, Farabow, Garrett, & Dunner

[57] ABSTRACT

An interconnection control method in a cordless telephone system having a connection unit connected to a subscriber line and a plurality of radio telephone sets connected through a radio communication circuit to the connection unit. Each of the radio telephone sets in a signal transmission mode, transmits, in a signal transmission mode, a calling signal containing group identification information and individual identification information. The connection unit, only when the received group identification information coincides with a predetermined content, returns a calling answer signal containing group identification information and individual identification information of the transmitting radio telephone sets and then establishes a speech channel between the connection unit and the other party telephone set.

7 Claims, 8 Drawing Sheets

FIG. 4 PART 1

FIG. 4 PART 2

FIG. 5 PART 1

FIG.5 PART 2

INTERCONNECTION CONTROL METHOD IN CORDLESS TELEPHONE SYSTEM

TECHNICAL FIELD

The present invention relates to an interconnection control method in a cordless telephone system which comprises a connection unit and a plurality of wireless or radio telephone sets.

BACKGROUND ART

Figure 6:
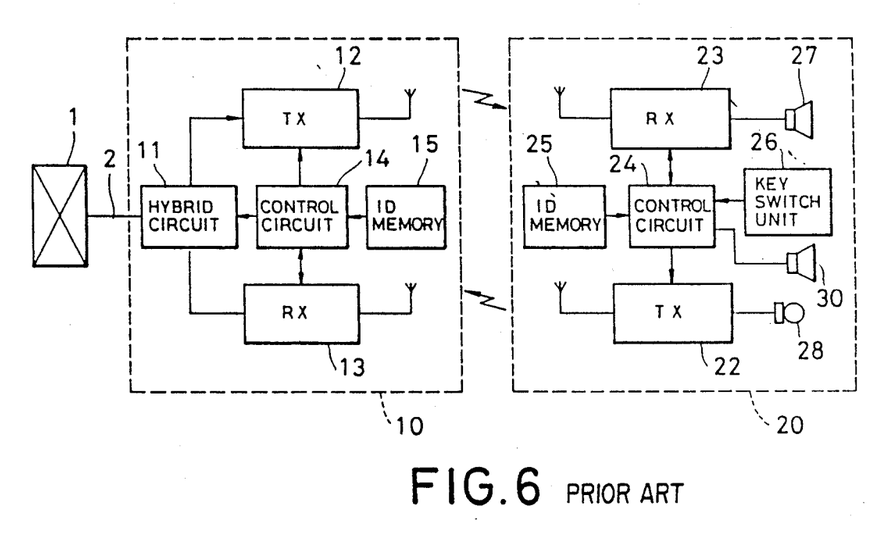
FIG. 6 is a block diagram showing an arrangement of a prior art cordless telephone system.

An example of such a sort of prior art cordless telephone systems is shown in FIG. 6. In the drawing, the system comprises a connection unit 10 which is connected to a subscriber line 2 of an exchange 1 in a central office and which includes a hybrid circuit 11 performing two-wire/four-wire conversion, a transmitter 12, a receiver 13, a control circuit 14 and an identification information memory 15. The system also comprises a radio telephone set 20 which is connected through a radio communication circuit to the connection unit 10 and which includes a transmitter 22, a receiver 23, a control circuit 24, an identification information memory 25, a key switch unit 26, a handset receiver 28 and a handset transmitter 28.

Figure 7A:
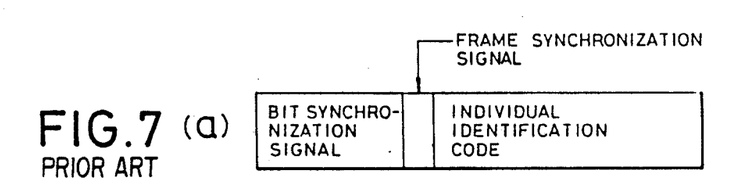
FIG. 7a–7b are the structures of a calling signal and a calling answer signal used in the prior art.

In such an arrangement, when an operator of the radio telephone set 20 depresses a calling key in the key switch unit 26 to made a call, information indicative of the call request is transferred to the control circuit 24. The circuit 24, when receiving the information, drives the transmitter 22 to transmit, in the form of radio waves on a control channel, a calling signal which comprises a bit synchronization signal, a frame synchronization signal and subsequently an identification code (ID code) unique to the radio telephone set 20, as shown in FIG. 7 (a).

Figure 7B:
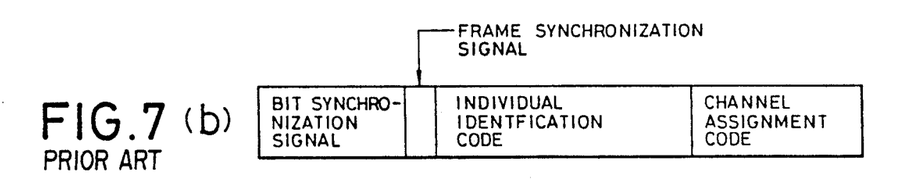

The connection unit 10, when receiving the identification code of the radio telephone set 20 which forms a pair with the unit 10 on the control channel, transmits, from the transmitter 12 in the form of radio waves on the control channel, a calling answer signal which comprises a bit synchronization signal, a frame synchronization signal, and subsequently a speech channel assignment code and the identification code of the telephone 20, as shown in FIG. 7(b).

When the radio telephone set 20 receives the calling answer signal at the receiver 23, the control circuit 24 switches the speech channel to the one assigned by the received answer signal. The connection unit 10 itself, on the other hand, switches the speech channel to the one assigned by its own. And after the connection unit 10 has confirmed that the switched channel is idle, the unit establishes a DC closed loop between the hybrid circuit 11 and the exchange 1, modulates a dial tone transmitted through the DC closed loop from the exchange 1 and then transmits the modulated dial tone from the transmitter 12 to the radio telephone set 20. On the side of the telephone 20, when the receiver 23 receives this dial tone, the tone is sounded at the handset receiver 27.

At this stage, operator's dial-number dialling operation on the side of the radio telephone set 20 causes the dial number to be transmitted through the radio communication circuit and the connection unit 10 toward the exchange 1. The transmission completion of the dial number causes the connection exchanging operation of the exchange 1, thus calling the party subscriber line. As a result, if the party subscriber answers the call, then the system is put in the speech mode.

When the operator of the radio telephone set 20 wants to terminate his conversation, he returns the calling key of the telephone to the initial position to put the telephone in an on-hook mode. This causes the on-hook signal to be transmitted to the connection unit 10. When a predetermined constant time has elapsed after the transmission of the on-hook signal, the radio telephone set 20 also transmits a speech end signal to the connection unit 10. The unit 10, when receiving the speech end signal, 'opens' the DC loop between the exchange 1 and the unit to release the subscriber line 2.

When the connection unit 10 receives a call from the subscriber line 2 in an await mode, the control circuit 14 of the unit 10 detects a calling signal received from the exchange 1 to transmit through the control channel of the transmitter 12 a call indicator signal which comprises the identification code of the radio telephone set 20 attached to a speech channel number beforehand checked and stored during the await mode operation.

The radio telephone set 20, when receiving the call indicator signal through the control channel, sets the channel of the receiver 23 to a speech channel assigned by the call indicator signal. When having confirmed that the assigned channel is idle, the telephone 20 transmits "channel switching completion signal" to the connection unit 10. The unit 10 itself also switches the speech channel to the one assigned by its own and when receiving the channel switching completion signal from the radio telephone 20, the unit 10 recognizes the establishment of the radio communication circuit and transmits a bell ringing signal to the radio telephone 20 in synchronism with the calling signal sent from the exchange 1.

The radio telephone set 20 generates a ringing tone from a sounder 30 in response to the reception of the bell ringing signal to call the user. When the user answers, it by picking up the handset of the telephone to provide an off-hook operation to the key switch unit, the off-hook signal is sent to the connection unit 10. The unit 10, when receiving this off-hook signal, establishes the DC closed loop between the exchange 1 and the unit to allow a speech between the subscriber line 2 and the radio telephone 20.

In the aforementioned calling and call indicator operations, the identification code of the radio telephone set 20 is previously stored in the identification information memory 25 of a ROM. When it is desired to call a subscriber line, the contents or ID code of the memory 25 is read out and transmitted to the connection unit 10. The unit 10, when receiving the ID code, compares it with the identification code previously stored in the identification information memory 15 to determine whether or not that the radio telephone 20 having issued the call forms a pair with its own for interconnection with the subscriber line.

When it is desired to make such a party-line cordless telephone system that a plurality of the radio telephone sets 20 are disposed in the service area of the connection unit 10 to allow the extension-call speech between the radio telephone sets as well as the outside-line speech between the radio telephones and the subscriber line, it is necessary to allocate individually unique identification codes to the respective radio telephone sets for the purpose of achieving the inter-call operation of the respective radio telephones. At the same time, the connection unit must store all the identification codes allocated to the radio telephone sets in the system.

When the unique identification codes are allocated to the respective telephone sets in this way, however, this involves such a problem that the connection unit must compare the received identification code with all the identification codes previously stored therein, which results in that a time necessary for transmitting a calling answer signal to the associated radio telephone becomes long. In addition, since the storage contents of the identification information memory must be modified according to an increase or decrease in the number of installed radio telephone sets, there occurs a problem that the management of the identification codes is troublesome and it is impossible to flexibly cope with the increase or decrease of the radio telephones.

Further, since a calling signal is issued with addition of only the identification code in the prior art, it is impossible to determine whether the calling signal is to be sent to the outside line or to the extension-call telephone, so that there is a possibility that, even in the case of the extension-call, a DC closed loop is undesirably established between the exchange and the connection unit.

Where a unique identification code is allocated to each of the plurality of radio telephone sets connected through a radio circuit to a connection unit connected to a telephone line, the connection unit must store a plurality of identification codes. Thus, the number of identification codes becomes several times larger than the number of the connection units. This configuration causes a problem in that as the number of bits in the identification codes increases the storage capacity necessary increases and transmission time of identification codes is increased. Furthermore, if there are 10,000 identification codes and each of the single party-line cordless telephone system is capable of having four of the radio telephone sets installed, the total number of such party line telephone systems which could be manufactured using a single set of identification codes would be 2,500. When it is required to install more than four radio telephone sets in each single party-line telephone system, the total number of such party line telephone systems is further reduced.

DISCLOSURE OF INVENTION

In view of the above problems, it is an object of the present invention to provide an interconnection control method in a cordless telephone system which can quickly return a calling answer signal, allow the easy management of identification codes, eliminate the unnecessary accession to an exchange and further allow the formation of the party-line cordless telephone systems corresponding in number to the sorts of the identification codes.

In accordance with the present invention, there is provided an interconnection control method in a cordless telephone system having a connection unit connected to a subscriber line and a plurality of radio telephone sets connected through a radio communication circuit to the connection unit, in which, when a call is issued from one of the radio telephone sets, a calling signal that contains a group identification code for identification of all the radio telephone sets to be connected with the connection unit and an individual identification code for identification of the one radio telephone set having issued the call is transmitted from the one radio telephone set to the connection unit; in response to reception of the calling signal, it is determined in the connection unit whether or not the group identification code contained in the calling signal coincides with associated one of group identification codes preset with respect to the connection unit; a calling answer signal that contains the group identification codes and the individual identification code is transmitted from the connection unit to the one radio telephone set having issued the call when coincidence is determined at the determination step; and thereafter the radio communication circuit is established between the one radio telephone set and the connection unit.

Each of the radio telephone sets transmits the calling signal containing the group identification information and the individual identification information. The connection unit, only when the group identification information coincides with a predetermined content, returns the calling answer signal containing the group identification information and individual identification information of the radio telephone set having issued the call and then establishes a speech circuit with respect to another telephone set.

BEST MODE FOR CARRYING OUT THE INVENTION

Figure 1:
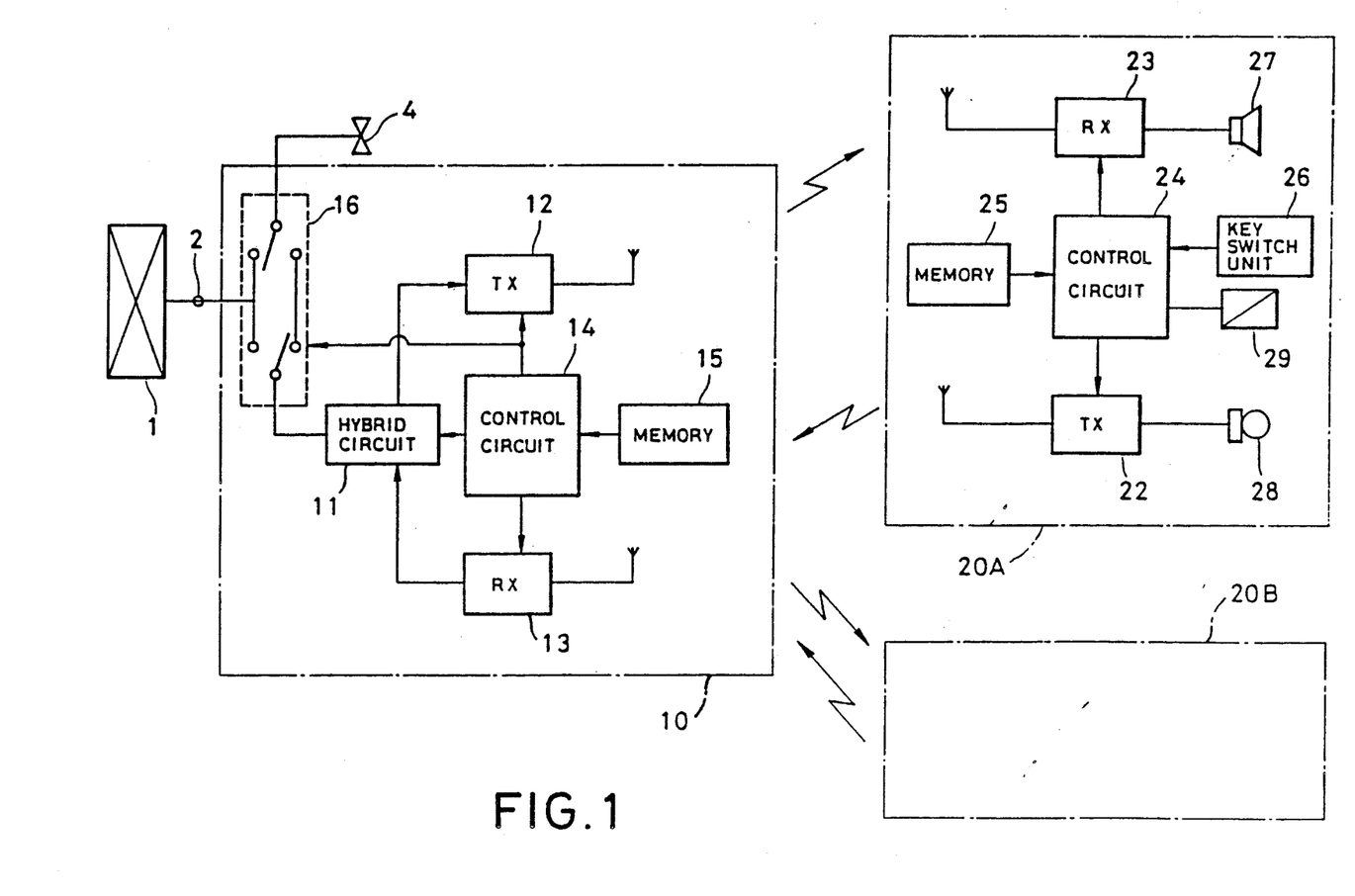
FIG. 1 is a block diagram showing an arrangement of an example of cordless telephone system to which the present invention is applied.

FIG. 1 shows a block diagram of an embodiment of the present invention, in which a connection unit 10 comprises, in addition to the same arrangement as the connection unit 10 shown in FIG. 6, a speech channel switching circuit 16 provided to connect an additional telephone set 4 to a subscriber line 1 or to connect the connection unit 10 to the subscriber line 1 so that even the additional telephone set 4 can enter into conversation with the subscriber line 1.

The embodiment also comprises two wireless telephone sets 20A and 20B each of which includes, in addition to the same arrangement as the radio telephone set 20 shown in FIG. 6, a change-over switch 29 for making a distiction between the extension call and outside-line call. Previously stored in the connection unit 10 and the identification information memories 25 of the radio telephone sets 20A and 20B are group identification codes for the respective same groups of radio telephone sets and individual identification codes unique to the respective radio telephone sets. When a user of the radio telephone set 20A or 20B wants to issue a call therefrom, he selects the outside-line at the change-over switch 29 and picks up the handset to put the telephone in an off-hook mode, such a calling signal comprising a bit synchronization signal, a frame synchronization signal, information indicative of the outside-line call, a group identification code and an individual identification code as shown in FIG. 2(a) is transmitted to the connection unit 10.

Figure 2:
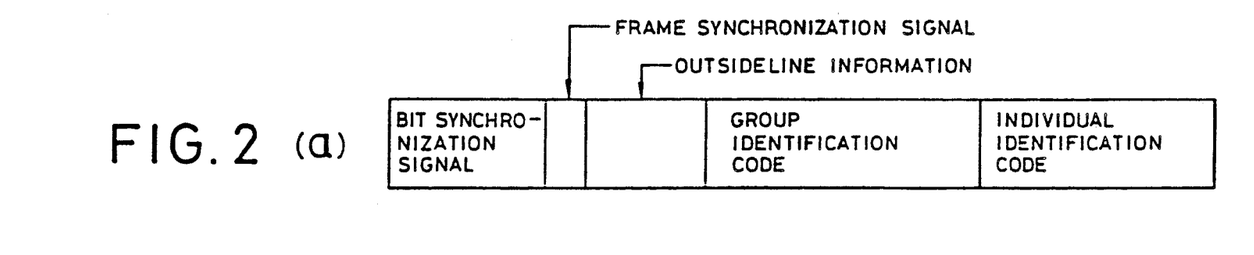
FIGS. 2A–2C are diagrams for explaining the structures of a calling signal and a calling answer signal in the embodiment.

Similarly, in the case of the extension call, such a calling signal comprising a bit synchronization signal, a frame synchronization signal, information indicative of the extension call, a group identification code and an individual identification code as shown in FIG. 2(b) is transmitted to the connection unit 10.

Figure 3:
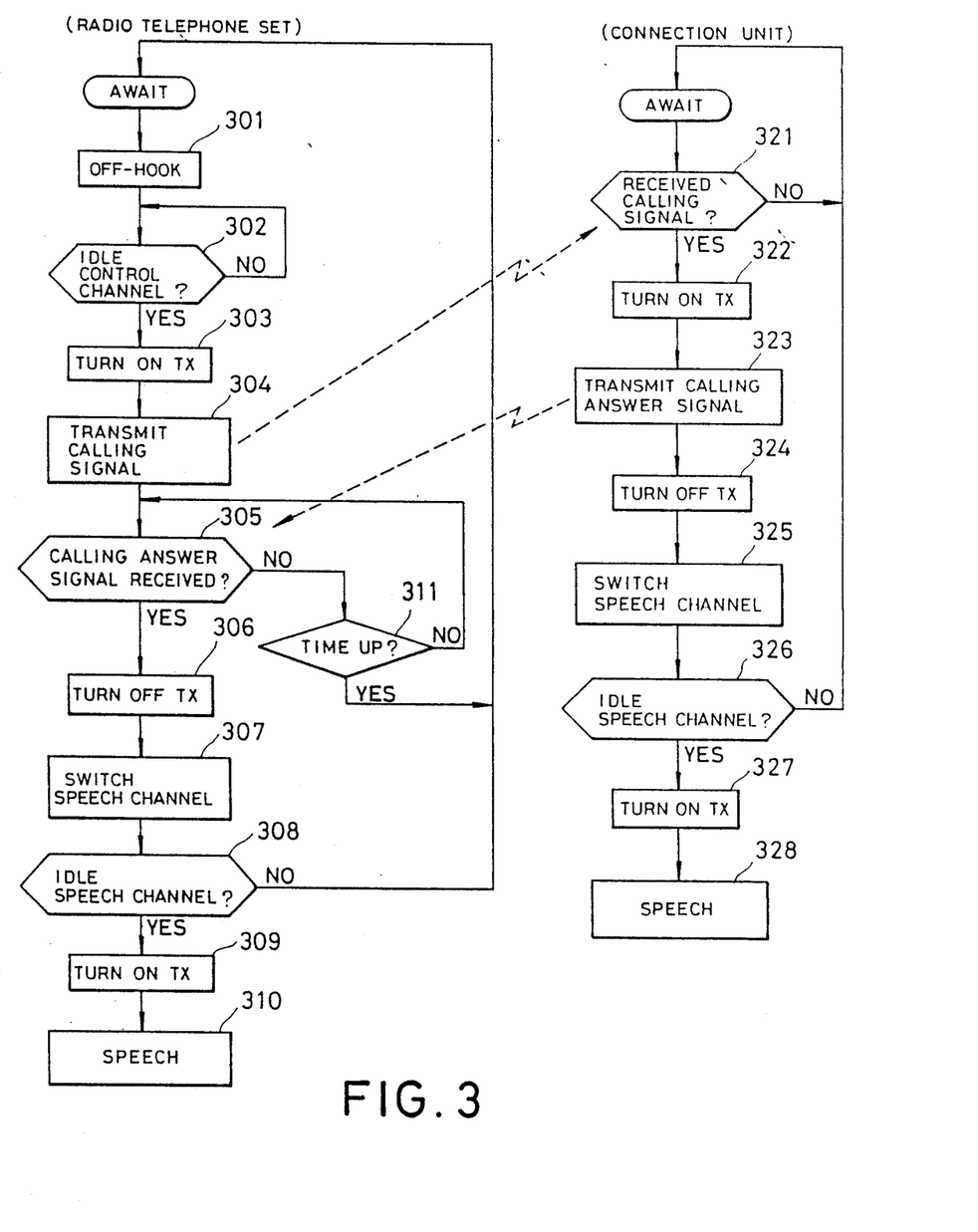
FIG. 3 is an interconnection sequence diagram in the case of an extension call or an outside-line call, showing an embodiment of the present invention.

The connection unit 10 having received such a calling signal, only when the received group identification code coincides with its own code, transmits to the radio telephone set 20A or 20B located in its own service area such a calling answer signal comprising a bit synchronization signal, a frame synchronization signal, information indicative of a calling answer for distinguishing from a call indicator signal to be transmitted at the time of receiving a call from the subscriber line 1, a group identification code, an individual identification code, and a speech-channel assignment code as shown in FIG. 3(c).

Accordingly, the connection unit 10 can transmit the calling answer signal immediately to the radio telephone set by judging only the group identification code. The associated radio telephone set, when receiving the calling answer signal, detects whether or not the received group identification code and individual identification code coincide with its own corresponding codes and if detecting the coincidence, then the telephone set enters into its subsequent speech-channel connection sequence.

In this case, if the connection unit 10 detects the extension call information, then the unit establishes not a DC closed loop between the exchange 1 and the unit but the extension speech channel to call one of the extension radio telephone sets corresponding to the dial number emitted from the calling side.

FIG. 3 is an interconnection sequence diagram when an extension call or an outside-line call was issued from the radio telephone set 20A or 20B. More specifically, the user of the radio telephone set 20A or 20B picks up the handset of the telephone to put the telephone in the off-hook mode (step 301), the control circuit 24 detects the off-hook operation, confirms that the control channel is idle (step 302), drives the transmitter 22 (step 303) and then transmits through the control channel the calling signal of such a structure as shown in FIG. 2(a) or (b) (step 304).

The connection unit 10, when receiving the calling signal through the control channel from the radio telephone set 20A or 20B in its own group, judges whether or not the received group identification code coincides with its own (step 321). The judgement of the coincidence causes the connection unit 10 to drive the transmitter 12 (step 322) to transmit through the control channel such a calling answer signal as shown in FIG. 2(c) (step 323).

The radio telephone set 20A or 20B, when receiving the calling answer signal at the receiver 23 (step 305), causes the control circuit 24 to temporarily turn off the transmitter 22 (step 306) and to switch the receiver 23 to the assigned speech channel (step 307). The connection unit 10, on the other hand, also turns temporarily off the transmitter 12 (step 324) and switches the speech channel to the one assigned (step 325). The connection unit 10 and the radio telephone set 20A or 20B both confirm that the switched channel is idle (steps 326 and 308), and then turns on the transmitters 12 and 22 (steps 327 and 309) to establish the DC closed loop between the hybrid circuit 11 and the exchange 1 in the case of the outside-line call. The connection unit 10 modulates a dial tone received from the exchange 1 through the DC closed loop and transmits it from the transmitter 12. This dial tone is received at the receiver 23 of the radio telephone set 20A or 20B and sounded at the handset receiver 27.

A dial number operation in the radio telephone set 20A or 20B causes the dial number to be transmitted through the radio communication circuit and the connection unit 10 to the exchange 1. The completion of transmission of the dial number enables the execution of exchange connection operation of the exchange 1 and the calling of the party subscriber. The response of the party subscriber to the call causes the system to be put in the speech mode allowing the conversation with the outside-line party (steps 328 and 310).

In the case of the extension call, the control circuit 14 of the connection unit 10 in place of the exchange 1 generates a dial tone and transmits it from the transmitter 12, whereby the radio telephone set 20A or 20B enters into an interconnection sequence similar to in the case of the outside-line call.

Figure 4:
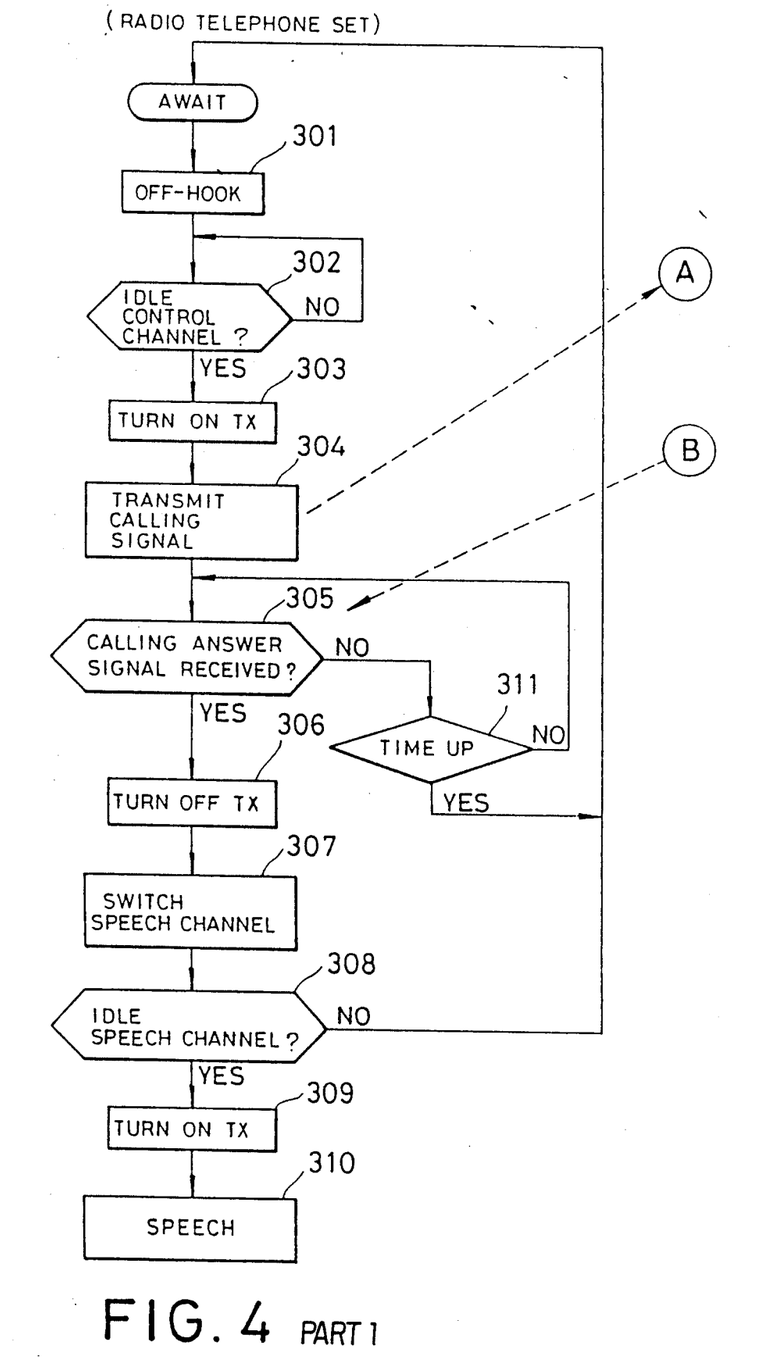
FIG. 4 parts 1 and 2 are an interconnection sequence diagram during use of the outside line, showing another embodiment of the present invention.

Such a situation is considered that, when the additional telephone set 4 is already in the speech mode with respect to the outside line party, an outside-line call is issued from the radio telephone set 20A or 20B. Since the radio telephone set 20A or 20B cannot confirm this fact, the time-up of a timer (step 311), which functions to monitor a time taken until the call-issued telephone 20A or 20B receives the returned normal calling answer signal, causes the wireless telephone to be put in the await mode to abandon the outside-line call. This results in that the user must uselessly repeat the outside-line calling operation. To avoid this, in another embodiment of the present invention, there is provided such a procedure, as shown in an interconnection sequence diagram of FIG. 4, that the control circuit 14 of the connection unit 10 detects whether or not the subscriber line 2 is occupied or used so that the detection of the occupation (step 401) causes the unit 10 to transmit the calling answer signal having the calling answer information attached with information indicative of the occupation (step 402), while the detection of the idle speech channel causes the transmission unit 12 to be turned off so as to stop the transmission of the calling answer signal containing the information indicative of the occupied speech channel (step 403). This enable the user to know by a busy tone emitted from the handset receiver that the subscriber line is already in use and thus the operator can again issue the outside-line call at the proper time when he estimates the idle state of the channel thereafter.

Further, the connection unit 10 may inform the radio telephone set 20A or 20B of whether or not the subscriber line is already in use by transmitting a particular channel assignment code to the telephone.

Since the connection unit 10 has only one pair of the transmitter 12 and the receiver 13, if one of the radio telephones 20A and 20B is in the speech mode, then the one occupies the connection unit 10 exclusively.

Accordingly, the other radio telephone set 20A or 20B, even if trying to issue an extension call or an outside-line call, cannot attain it successfully. In addition, the user of the other radio telephone set 20A or 20B cannot know, in this case, the reason why he cannot attain his speech, that is, the cause that the additional telephone set 4 already uses the subscriber line or that the other radio telephone set 20A or 20B is talking with the party or the user's telephone is located out of its service area.

Figure 5:
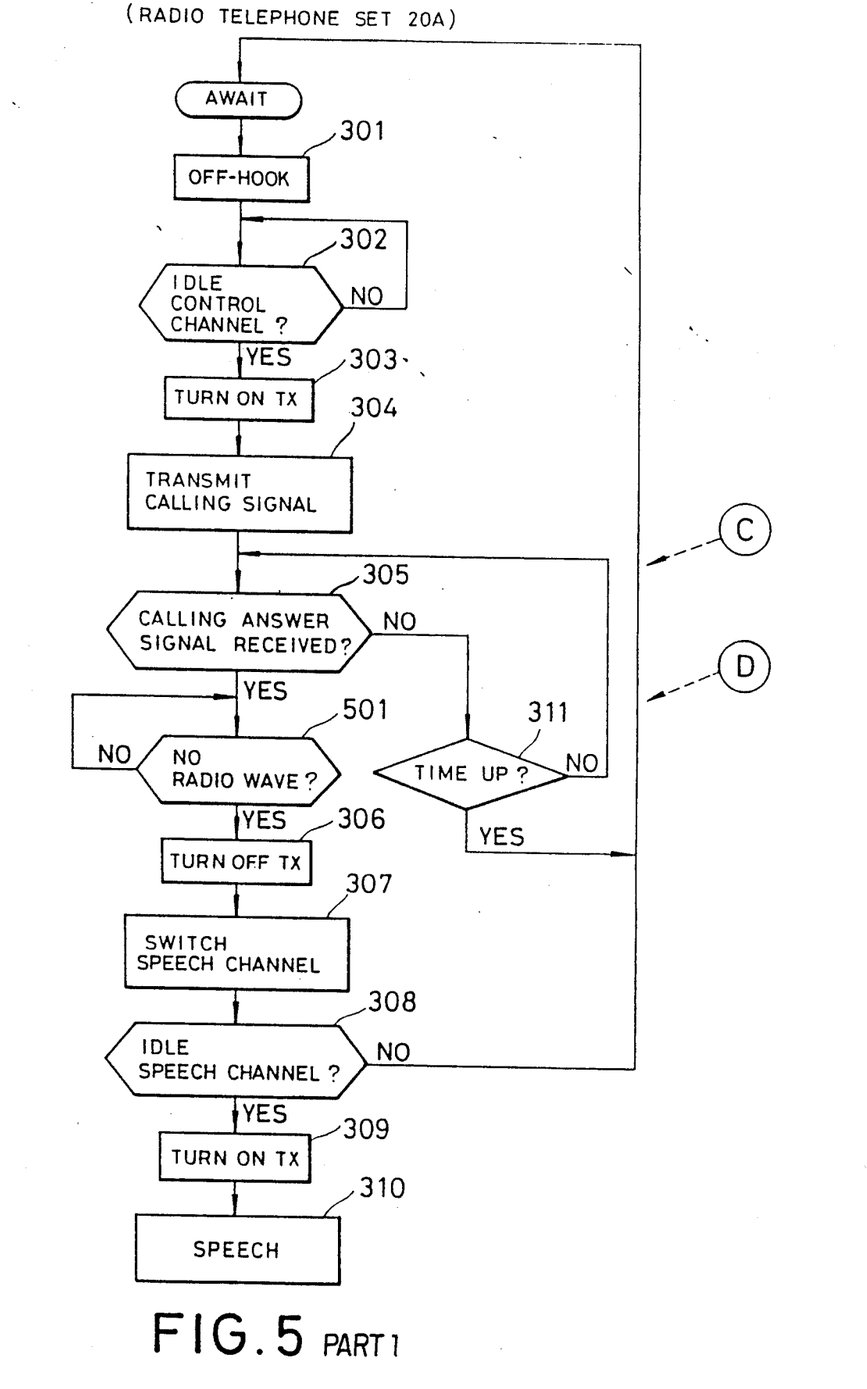
FIG. 5, parts 1 and 2 are an interconnection sequence diagram when a connection unit is used by another radio telephone set, showing yet another embodiment of the present invention.

To eliminate such a defect, in yet a further embodiment of the present invention, a calling answer signal is transmitted many times from the connection unit 10, the speech channels of the radio telephone sets 20A and 20B are switched to the assigned ones (steps 307 and 503) at the stage when the transmitter 12 of the connection unit 10 is turned off and the radio telephone sets receive no radio waves (steps 501 and 502), so that, if the received individual identification code coincides with that of the radio telephone 20A, then the system puts only the telephone 20A in the speech mode while not returning the telephone 20B to the await mode, but forcibly put it in the wave reception mode (step 504), as shown by an interconnection sequence diagram in FIG. 5. With such an arrangement, since the user of the radio telephone set 20B knows that the telephone is in a call disable state, even user's calling operation causes the immediate information of a busy tone or the like to the user, thus eliminating the useless labor of the user of the telephone 20B.

INDUSTRIAL APPLICABILITY

In this way, in accordance with the present invention, since a calling answer is effected on the basis of the judgement of a group identification code, the calling answer time can be shortened and party-line cordless telephone systems corresponding in number to the sorts of the group identification codes can be manufactured. Further, the invention can cope flexibly with the increase or decrease of the number of radio telephone sets installed in each of the systems. In addition, the employment of information indicative of the distinction between the extension call and outside-line call can eliminates unnecessary accession to an exchange.

We claim:

1. An interconnection control method in a cordless telephone system having a connection unit connected to a subscriber line and a plurality of radio telephone sets connected through a radio communication circuit to said connection unit, said method comprising:
   a step of, when a call is issued from one of said radio telephone sets, transmitting from said one radio telephone set to said connection unit a calling signal that contains a group identification code for identification of all the radio telephone sets to be connected with said connection unit and an individual identification code for identification of said one radio telephone set having issued the call;
   a step of, in response to reception of said calling signal determining by said connection unit whether or not said group identification code contained in said calling signal coincides with associated one of said group identification codes preset with respect to said connection unit;
   a step of transmitting a calling answer signal that contains said group identification code and said individual identification code from said connection unit to said one radio telephone set having issued the call when coincidence is determined at said determination step;
   a step of establishing said radio communication circuit between said one radio telephone set and said connection unit after the transmission of said calling answer signal; and
   a step of transmitting said calling answer signal a plurality of times to forcibly set the radio telephone sets other than said one radio telephone set having issued the call in a wave reception mode.

2. An interconnection control method in a cordless telephone system as set forth in claim 1, further comprising a step of monitoring a time after the transmitting of said calling signal before the returning of said calling answer signal and forcibly putting said one radio telephone set having issued the call in an await mode.

3. An interconnection control method in a cordless telephone system as set forth in claim 1 or 2, wherein said calling answer signal contains information indicative of whether or not said subscriber line is already in use, and further comprisinng a step of, when the subscriber line is in use, informing said one radio telephone set having issued the call that the subscriber line is in use.

4. An interconnection control method in a cordless telephone system having a connection unit connected to a subscriber line and a plurality of radio telephone sets connected through a radio communication circuit to said connection unit, said method comprising:
   a step of, when a call is issued from one of said radio telephone sets, transmitting from said one radio telephone set to said connection unit a calling signal that contains information differentiating between an extension call and an outside-line call, a group identification code for identification of all the radio telephone sets to be connected with said connection unit and an individual identification code for identification of said one radio telephone set having issued the call;
   a step of, in response to reception of said calling signal, determining by said connection unit whether or not said group identification code contained in said calling signal coincides with an associated one of said group identification codes preset with respect to said connection unit;
   a step of transmitting a calling answer signal that contains said group identification code and said individual identification code from said connection unit to said one radio telephone set having issued the call when coincidence is determined at said determination step; and
   a step of, after the transmission of said calling answer signal, establishing an extension speech channel through said connection unit when said information contained in said calling signal indicates said extension call between said one radio telephone set having issued the call and the other radio telephone sets and of establishing a DC closed loop between said subscriber line and said connection unit when said information indicates said outside-line call.

5. An interconnection control method in a cordless telephone system as set forth in claim 4, further comprising a step of monitoring a time after the transmission of said calling signal after the returning of said calling answer signal and of forcibly putting said one radio telephone set having issued the call in an await mode when said time exceeds a predetermined value.

6. An interconnection control method in a cordless telephone system as set forth in claim 4 or 5 wherein said calling answer signal contains information indicative of whether or not said subscriber line is already in use, and further comprising a step of, when the subscriber line is in use, informing said one radio telephone set having issued the call that the subscriber line is in use.

7. An interconnection control method in a cordless telephone system as set forth in claim 4 or 5 further comprising a step of transmitting said calling answer signal a plurality of times to forcibly set the radio telephone sets other than said one radio telephone set having issued the call in a wave reception mode.

* * * * *